(12) United States Patent
Ogawa et al.

(10) Patent No.: US 6,491,397 B2
(45) Date of Patent: Dec. 10, 2002

(54) ILLUMINATION OPTICAL SYSTEM AND PROJECTOR USING THE SAME

(75) Inventors: Yasunori Ogawa, Suwa (JP); Hidemasa Yamakawa, Azusagawa-mura (JP); Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/892,905

(22) Filed: Jun. 28, 2001

(65) Prior Publication Data

US 2002/0018150 A1 Feb. 14, 2002

(30) Foreign Application Priority Data

Jul. 4, 2000 (JP) ........................................ 2000-201841

(51) Int. Cl.[7] ........................... G03B 21/14; G02B 27/10
(52) U.S. Cl. ........................................ 353/20; 359/619
(58) Field of Search .............................. 353/20, 34, 37, 353/121, 122, 102, 31; 359/487, 485, 619, 621, 622; 348/8, 9

(56) References Cited

U.S. PATENT DOCUMENTS 6,104,536 A * 8/2000 Eckhardt .................... 359/619

6,373,629 B1 * 4/2002 Yamagishi et al. ............ 349/5

OTHER PUBLICATIONS

Xiaoqiang et al., Patent Abstracts of Japan, publication No.: 10–032594, filing date Apr. 4, 1997.*

* cited by examiner

Primary Examiner—Russell Adams
Assistant Examiner—Andrew Sever
(74) Attorney, Agent, or Firm—Oliff & Berridge, PLC

(57) ABSTRACT

In a second lens array 130A of an illumination optical system according to the present invention, the position of curved faces of third minute lenses 132A$b$ is displaced from the position of curved faces of second minute lenses 132A$a$. Such displacement makes the size of a first region W1 on an illuminating area LA, which is irradiated with light transmitted by polarizing separation films 142, substantially equal to the size of a second region W2 on the illuminating area LA, which is irradiated with light reflected by the polarizing separation films 142 and reflection films 144. This arrangement effectively prevents the significant reduction of the illuminating efficiency occurring in a prior art illumination optical system that utilizes a polarization conversion optical system.

10 Claims, 13 Drawing Sheets

Fig. 2A
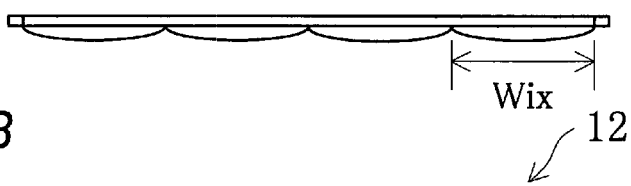
Fig. 2B
Fig. 2C
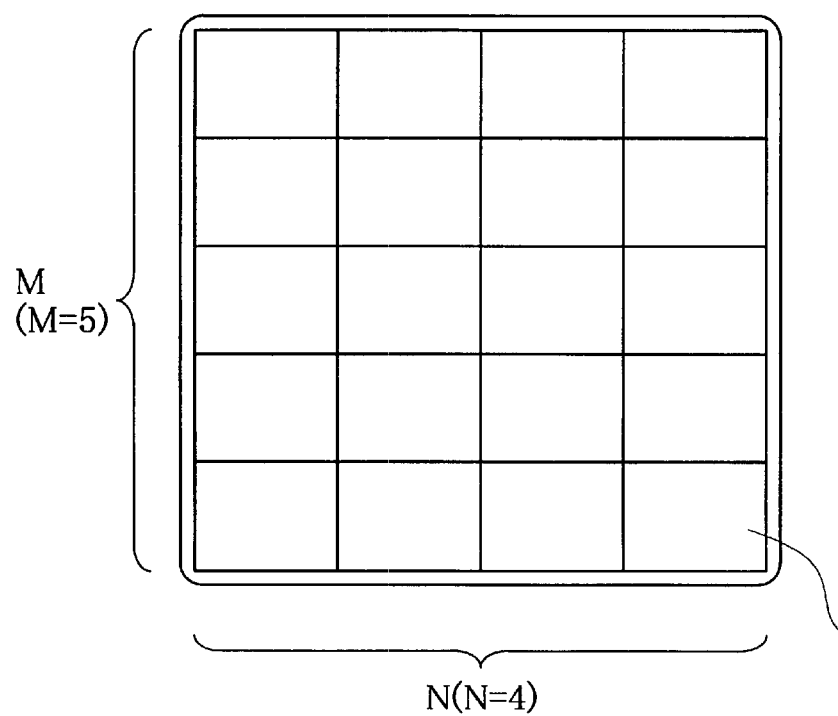

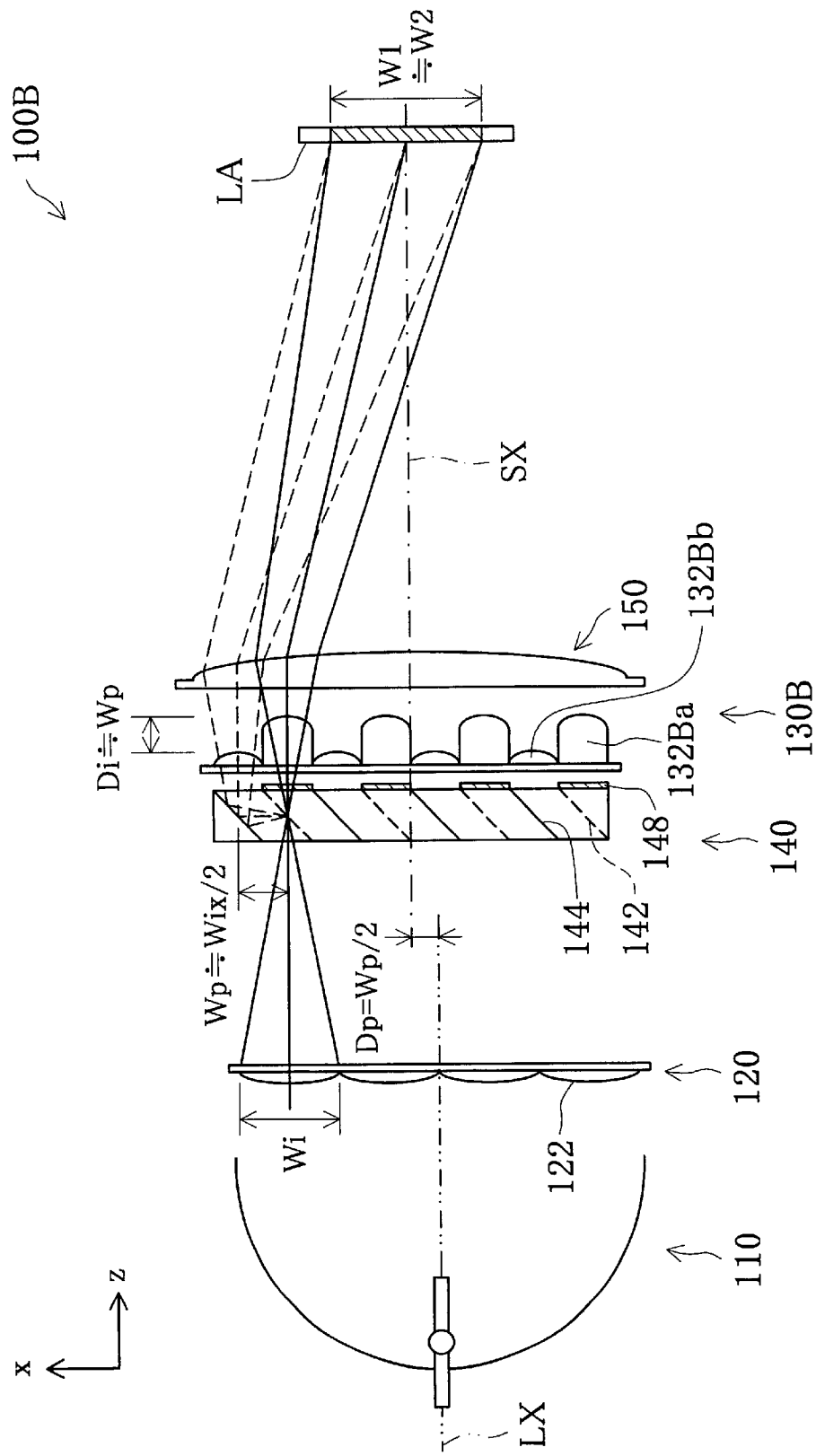

ILLUMINATION OPTICAL SYSTEM AND PROJECTOR USING THE SAME

BACKGROUND OF THE INVENTION

1. Field of the Invention

The present invention relates to an illumination optical system that converts non-polarized light rays emitted from a light source into one type of linearly polarized light beams having a substantially fixed direction of polarization. The present invention also pertains to a projector that utilizes the illumination optical system to display bright images.

2. Description of the Related Art

The projector modulates illumination light transmitted to an electro-optical device called 'light valve' according to image information regarding an image to be displayed and projects the modulated light on a screen to display the resulting image. A liquid crystal light valve utilizing the functions of a liquid crystal panel is generally used for the electro-optical device.

It is naturally desirable to display bright images by the projector. For this purpose, the illumination light emitted from an illumination optical system incorporated in the projector preferably has the high utilization efficiency. The liquid crystal light valve included in the projector generally utilizes only one type of linearly polarized light beams. In the case of an illumination optical system that emits non-polarized light beams, light beams having a certain direction of polarization are not utilized in the liquid crystal light valve. This worsens the utilization efficiency of the illumination light emitted from the illumination optical system. For the enhanced utilization efficiency of the illumination light by the liquid crystal light valve, some proposed illumination optical systems use a polarization conversion optical system that converts the non-polarized light beams emitted from a light source into one type of linearly polarized light beams.

FIG. 13 is a plan view schematically illustrating the structure of a main part of a prior art illumination optical system. In the description below, the direction of advance of light is defined as a z-axis direction (direction in parallel with a system optical axis SX of the illumination optical system), the direction of 12 o'clock relative to the direction of advance of light is defined as a y-axis direction (vertical direction), and the direction of 3 o'clock relative to the direction of advance of light is defined as an x-axis direction (horizontal direction). The illumination optical system includes a light source 1110, a first lens array 1120, a second lens array 1130, a polarization conversion optical system 1140, and a superimposing lens 1150, which are arranged sequentially along the system optical axis SX. The first lens array 1120 has a plurality of minute lenses 1122. The second lens array 1130 has a plurality of minute lenses 1132, which respectively correspond to the plurality of minute lenses 1122 of the first lens array 1120.

The polarization conversion optical system 1140 includes plural pairs of mutually parallel polarizing separation films 1142 and reflection films 1144, which are arranged sequentially in the x-axis direction. The polarizing separation films 1142 and the reflection films 1144 are inclined to have a fixed angle relative to the z-axis direction. λ/2 phase plates 1148 are attached to the outgoing faces of the respective polarizing separation films 1142.

Substantially parallel light rays emitted from the light source 1110 are divided into a plurality of sub-beams by the plurality of minute lenses 1122 of the first lens array 1120. The condensing functions of the respective minute lenses 1122 of the first lens array 1120 and the minute lenses 1132 of the second lens array 1130 cause the plurality of sub-beams to be condensed in the vicinity of the polarizing separation films 1142 in the polarization conversion optical system 1140. An optical axis LX of the light source 1110 is displaced in a −x-axis direction from the system optical axis SX of the illumination optical system by a predetermined amount of displacement Dp (=Wp/2), in order to allow the plurality of sub-beams emitted from the first lens array 1120 to efficiently enter the polarizing separation films 1142 of the polarization conversion optical system 1140. Here Wp denotes the distance between the polarizing separation film 1142 and the reflection film 1144.

Out of the light beams condensed in the vicinity of the polarizing separation films 1142, one type of linearly polarized light beams (for example, p-polarized light beams) are mostly transmitted by the polarizing separation films 1142, whereas the other type of linearly polarized light beams (for example, s-polarized light beams) are mostly reflected by the polarizing separation films 1142. The other type of linearly polarized light beams reflected by the polarizing separation films 1142 are further reflected by the reflection films 1144 and enter the superimposing lens 1150. One type of linearly polarized light beams transmitted by the polarizing separation films 1142, on the other hand, enter the λ/2 phase plates 1148 to be converted to linearly polarized light beams having the same direction of polarization as that of the other type of linearly polarized light beams, and subsequently enter the superimposing lens 1150. The plurality of sub-beams entering the superimposing lens 1150 are substantially superimposed on an area LA to be illuminated. The prior art illumination optical system thus enables the area to be illuminated with substantially one type of linearly polarized light beams.

FIG. 14 shows drawbacks of the prior art illumination optical system. FIG. 14A shows the optical path of the light transmitted by the polarizing separation film 1142 (hereinafter may be simply referred to as the 'transmitted light'). FIG. 14B shows, on the other hand, the optical path of the light reflected by the polarizing separation film 1142 and the reflection film 1144 (hereinafter may be simply referred to as the 'reflected light'). For the simplicity of explanation, in the illustration of FIGS. 14A and 14B, the optical path of the reflected light by the polarizing separation film 1142 and the reflection film 1144 is replaced by an equivalent linear optical path, and deflection of light by the superimposing lens 1150 is neglected.

As shown in FIGS. 14A and 14B, in the prior art illumination optical system, out of the light beams entering the polarizing separation film 1142, an optical path length of the reflected light between the polarizing separation film 1142 and the area LA is greater than an optical path length L2 of the transmitted light by the distance Wp between the polarizing separation film 1142 and the reflection film 1144. The difference in optical path length makes the size of a second region W2 on the area LA, which is illuminated with the reflected light, greater than the size of a first region W1 on the area LA, which is illuminated with the transmitted light. This causes the illuminating efficiency with the reflected light to be lower than the illuminating efficiency with the transmitted light, thus significantly reducing the total illuminating efficiency in the illumination optical system.

SUMMARY OF THE INVENTION

The object of the present invention is thus to provide a technique that prevents the significant reduction of the illuminating efficiency occurring in the prior art illumination optical system that utilizes the polarization conversion optical system.

At least part of the above and the other related objects is attained by an illumination optical system that emits illumination light. The illumination optical system includes: a light source that emits non-polarized light; a polarization conversion optical system that has at least one pair of a polarizing separation film and a reflection film, which are arranged to be mutually in parallel with each other and to be inclined relative to a predetermined direction, the polarization conversion optical system converting incident non-polarized light into linearly polarized light having a predetermined direction of polarization; a first optical system that has at least one first lens, which is arranged on an optical path between the light source and the polarizing separation film to emit a first light beam; and a second optical system that has a second lens, which receives an incident second light beam that is a component of the first light beam emitted from the first lens and is transmitted by the polarizing separation film, and a third lens, which receives an incident third light beam that is another component of the first light beam emitted from the first lens and is reflected by the polarizing separation film and the reflection film. Here an optical property of at least one of the second lens and the third lens is adjusted to make a size of a first region on a predetermined area, which is irradiated with the second light beam, substantially equal to a size of a second region on the predetermined area, which is irradiated with the third light beam.

In the illumination optical system of the present invention, the adjustment is carried out to make the size of the first region on the predetermined area, which is irradiated with the second light beam, substantially equal to the size of the second region on the predetermined area, which is irradiated with the third light beam. This arrangement effectively prevents the significant reduction of the illuminating efficiency occurring in the prior art illumination optical system that utilizes the polarization conversion optical system. The technique of the present invention thus actualizes the illumination optical system having the high illuminating efficiency.

In accordance with one preferable application of the illumination optical system of the present invention, the adjustment displaces the position of a curved face of the third lens from the position of a curved face of the second lens.

The adjustment of displacing the position of the curved face of the third lens from the position of the curved face of the third lens makes the size of the first region on the predetermined area, which is irradiated with the second light beam, substantially equal to the size of the second region on the predetermined area, which is irradiated with the third light beam.

Here it is preferable that the second lens and the third lens have curved faces of an identical shape.

The simple adjustment of displacing the position of the curved face of the third lens from the position of the curved face of the second lens thus readily makes the size of the first region on the predetermined area, which is irradiated with the second light beam, substantially equal to the size of the second region on the predetermined area, which is irradiated with the third light beam.

In the illumination optical system of the present invention, a difference Di between the position of the curved face of the second lens and the position of the curved face of the third lens is determined by an equation given below:

$$Di = (Wp \cdot Wi)/(Wi + W)$$

where Wi denotes a size of the first lens, W denotes the size of the first area, and Wp denotes a distance between the polarizing separation film and the reflection film.

This application readily determines the relationship between the position of the curved face of the second lens and the position of the curved face of the third lens.

The present invention is also directed to a projector that projects an image. The projector includes: an illumination optical system that emits illumination light; an electro-optical device that modulates the light emitted from the illumination optical system according to image information; and a projection optical system that projects the modulated light by the electro-optical device. The illumination optical system includes: a light source that emits non-polarized light; a polarization conversion optical system that has at least one pair of a polarizing separation film and a reflection film, which are arranged to be mutually in parallel with each other and to be inclined relative to a predetermined direction, the polarization conversion optical system converting incident non-polarized light into linearly polarized light having a predetermined direction of polarization; a first optical system that has at least one first lens, which is arranged on an optical path between the light source and the polarizing separation film to emit a first light beam; and a second optical system that has a second lens, which receives an incident second light beam that is a component of the first light beam emitted from the first lens and is transmitted by the polarizing separation film, and a third lens, which receives an incident third light beam that is another component of the first light beam emitted from the first lens and is reflected by the polarizing separation film and the reflection film. Here an optical property of at least one of the second lens and the third lens is adjusted to make a size of a first region on the electro-optical device, which is irradiated with the second light beam, substantially equal to a size of a second region on the electro-optical device, which is irradiated with the third light beam.

The projector of the present invention utilizes the illumination optical system of the present invention discussed above, thus enabling the electro-optical device to be irradiated with light at a higher efficiency, compared with a projector that utilizes the prior art illumination optical system. The projector of the present invention thus enables brighter images to be displayed.

BRIEF DESCRIPTION OF THE DRAWINGS

FIGS. 2A through 2C show the appearance of a first lens array 120 included in the illumination optical system of FIG. 1;

FIG. 7 is a plan view schematically illustrating the structure of another illumination optical system 100B, which is one modification of the illumination optical system 100A of FIG. 1;

DESCRIPTION OF THE PREFERRED EMBODIMENTS

Figure 1:
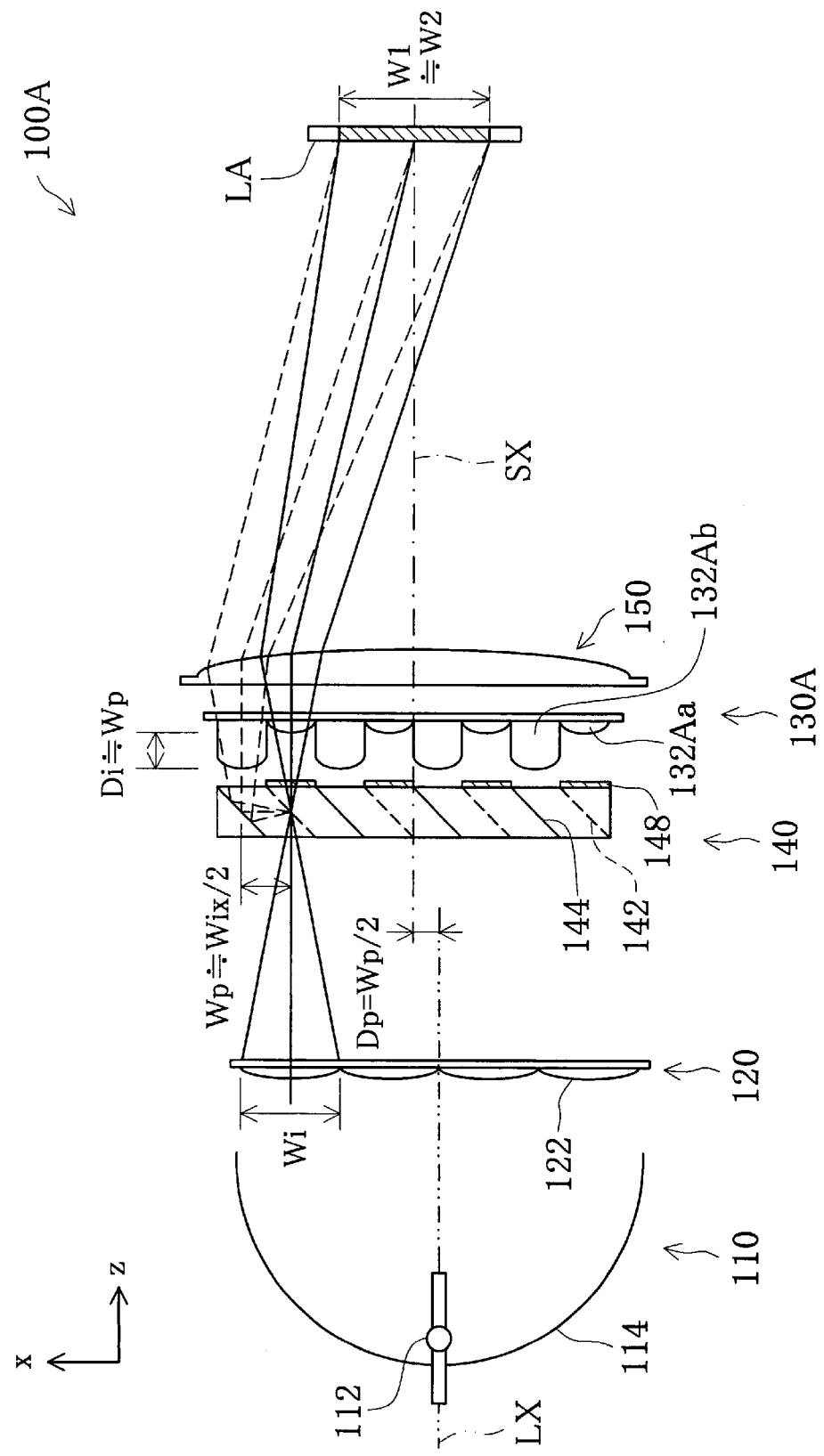
FIG. 1 is a plan view schematically illustrating the structure of a main part of an illumination optical system in one embodiment of the present invention.

One embodiment of the present invention is discussed below with referring to the drawings. In the embodiment discussed below, the direction of advance of light is defined as a z-axis direction (direction in parallel with the optical axis), the direction of 12 o'clock relative to the direction of advance of light is defined as a y-axis direction (vertical direction), and the direction of 3 o'clock relative to the direction of advance of light is defined as an x-axis direction (horizontal direction), unless otherwise specified.

A. Optical Illuminating Systems

FIG. 1 is a plan view schematically illustrating the structure of a main part of an illumination optical system 100A in one embodiment of the present invention. The illumination optical system 100A includes a light source 110, a first lens array 120, a polarization conversion optical system 140, a second lens array 130A, and a superimposing lens 150. The polarization conversion optical system 140, the second lens array 130A, and the superimposing lens 150 are arranged to have their central optical axes substantially coincident with a system optical axis SX of the whole illumination optical system 100A. A light source optical axis LX of the light source 110 is displaced substantially in parallel in a −x-axis direction from the system optical axis SX by a predetermined amount of displacement Dp. The amount of displacement Dp will be discussed later.

The light source 110 includes a light source lamp 112 serving as a radiation light source that radially emits light beams, and a concave mirror 114 that makes the light beams radially emitted from the light source lamp 112 directed to the first lens array 120. A metal halide lamp or a high-pressure mercury lamp is generally applied for the light source lamp 112. A parabolic mirror or an ellipsoidal mirror is preferably used for the concave mirror 114. The parabolic mirror attains emission of substantially parallel light beams, whereas the ellipsoidal mirror attains emission of condensed light beams. In this embodiment, the parabolic mirror is applied for the concave mirror 114.

FIG. 2 shows the appearance of the first lens array 120. FIGS. 2A, 2B, and 2C are respectively a plan view, a front view, and a side view. The first lens array 120 includes first minute planoconvex lenses 122 that have a substantially rectangular profile and are arranged in a matrix of M columns by N rows. In the example of FIG. 2, M=5 and N=4. It is preferable that the contour of each first minute lens 122 seen from the front side (that is, the z-axis direction) is practically similar to the contour of an illuminating region of interest, which is included in an area LA to be illuminated and is to be actually illuminated by the illumination optical system 10A. As described later, in the case of application of the illumination optical system 100A of the embodiment for a projector using liquid crystal light valves, when an image formation area of the liquid crystal light valve has an aspect ratio of 4 to 3 (the ratio of the horizontal dimension to the vertical dimension), the aspect ratio (Wix:Wiy) of the first minute lens 122 is set substantially equal to 4 to 3. This arrangement causes the illuminating region of interest in the illumination area LA illuminated with a bundle of light rays emitted from the first minute lenses 122 to have the contour practically similar to the contour of the first minute lens 122.

Figure 3:
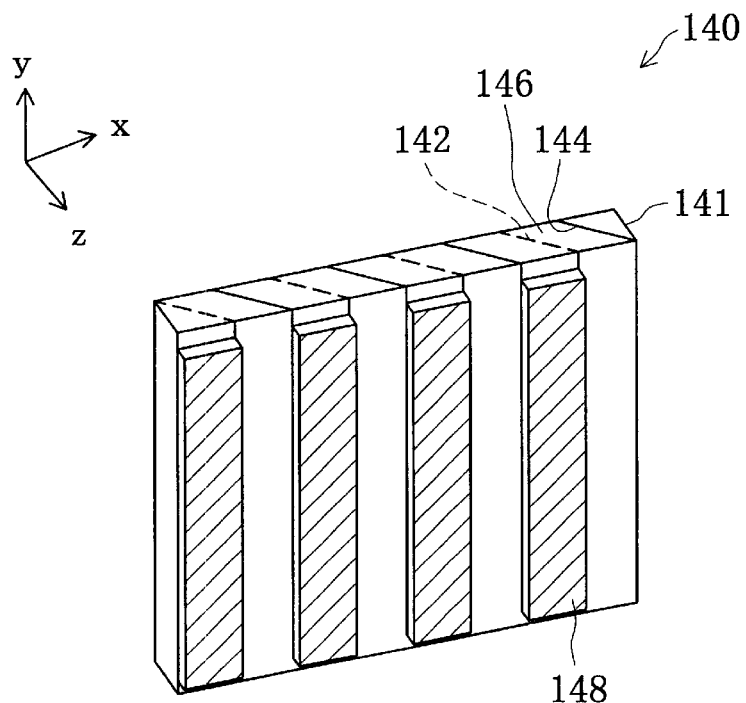
FIG. 3 is a perspective view showing the appearance of a polarization conversion optical system 140 included in the illumination optical system of FIG. 1.

FIG. 3 is a perspective view showing the appearance of the polarization conversion optical system 140. The polarization conversion optical system 140 includes a polarized beam splitter array 141 and λ/2 phase plates 148 (filled with slant lines) that are selectively arranged on part of the light emitting faces of the polarized beam splitter array 141. The polarized beam splitter array 141 is prepared by successively bonding a plurality of columnar light transmissive members 146 of a parallelogrammatic cross section. Polarizing separation films 142 and reflection films 144 are formed alternately on the interfaces of the light transmissive members 146. The λ/2 phase plates 148 are selectively attached to x-direction mapping portions of the light emitting faces on either the polarizing separation films 142 or on the reflection films 144. In this embodiment, the λ/2 phase plates 148 are bonded to the x-direction mapping portions of the light emitting faces on the polarizing separation films 142. The polarized beam splitter array 141 is manufactured by bonding a plurality of glass plates with the polarizing separation films 142 and the reflection films 144 formed thereon to be arranged alternately and subsequently cutting the block of glass plates obliquely at a preset angle. The polarizing separation films 142 are composed of a dielectric multi-layered film, and the reflection films 144 are composed of a dielectric multi-layered film or an aluminum film.

Figure 4:
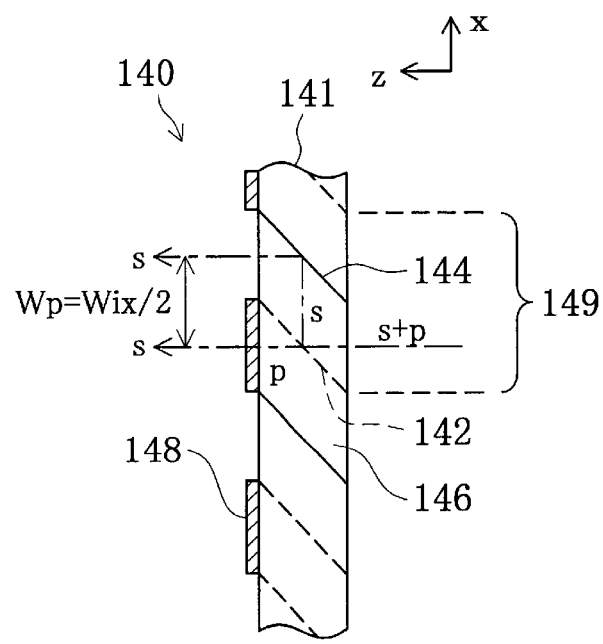
FIG. 4 shows the function of the polarization conversion optical system 140.

The polarization conversion optical system 140 functions to convert an incident light into one identical type of linearly polarized light beams (for example, s-polarized light beams or p-polarized light beams) and emits the identical type of linearly polarized light beams. FIG. 4 shows the function of the polarization conversion optical system 140. Non-polarized light including s-polarized light components and p-polarized light components (that is, incident rays having random polarization directions) enters in the polarization conversion optical system 140. The incident light rays are first divided into s-polarized light components and p-polarized light components by the polarizing separation films 142. The p-polarized light components directly pass through the polarizing separation films 142. The λ/2 phase plates 148 are attached to the outgoing faces of the p-polarized light beams transmitted through the polarizing separation films 142. The λ/2 phase plates 148 convert the entering p-polarized light beams into s-polarized light beams and emit the resulting s-polarized light beams. The s-polarized light components are, on the other hand, reflected practically perpendicularly Ad from the polarizing separation films 142, and are further reflected by the reflection films 144. The resulting reflected light beams are emitted substantially in parallel with the s-polarized light beams, which are transmitted through the polarizing separation films 142 and converted by the λ/2 phase plates 148, but translated in the x-axis direction from the s-polarized light beams by a distance Wp. The light rays entering the polarization conversion optical system 140 are emitted mostly as the s-polarized light beams. When it is desired to emit the p-polarized light beams from the polarization conversion optical system, λ/2 phase plates 148 are arranged on the outgoing faces of the s-polarized light beams reflected by the reflection films 144.

Each block that includes one polarizing separation film 142 and one reflection film 144 adjoining to each other and one λ/2 phase plate 148 may be regarded as one polarization conversion element 149. The polarized beam splitter array 141 is prepared by arranging a plurality of such polarization conversion elements 149 in the x-axis direction. In this embodiment, the polarized beam splitter array 141 includes four polarization conversion elements 149.

As clearly understood from FIG. 4, the center of the two types of s-polarized light beams emitted from the polarization conversion optical system 140 (that is, the middle of the two types of s-polarized light beams) is displaced in the x-axis direction from the center of the non-polarized incident rays (s-polarized light components+p-polarized light components). The amount of displacement is substantially equal to half the distance Wp between the polarizing separation film 142 and the reflection film 144 (that is, the width of the polarizing separation film 142 in the x-axis direction). As shown in FIG. 1, the optical axis LX of the light source 110 is accordingly set at a position displaced from the system optical axis SX by the amount of displacement Dp, which is substantially equal to Wp/2. Here the distance Wp is set substantially equal to half the width Wix of the first minute lens 122 in the x-axis direction (see FIG. 2).

As described above, the light rays entering the polarization conversion optical system 140 are partly transmitted through the polarizing separation films 142 and other partly reflected by the polarizing separation films 142. Each of the plurality of sub-beams emitted from the first lens array 120 is converted into two sub-beams while passing through the polarization conversion optical system 140.

Figure 5A:
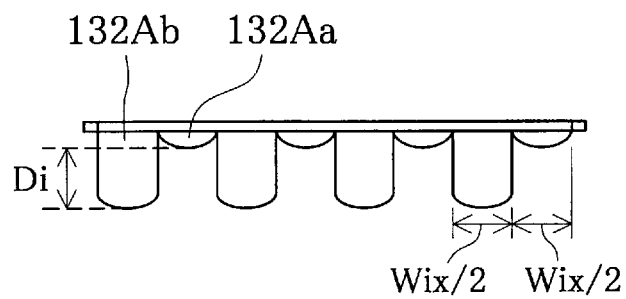
FIGS. 5A through 5C show the appearance of a second lens array 130A included in the illumination optical system of FIG. 1.
Figure 5B:
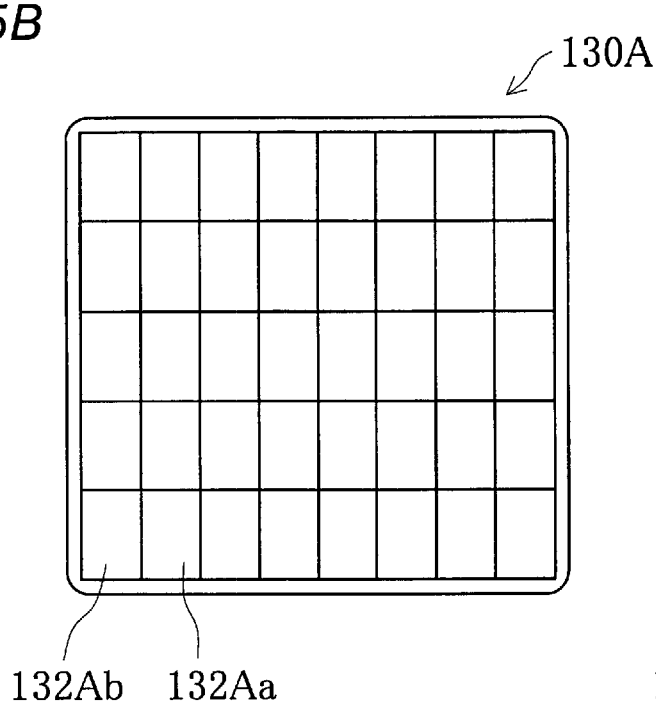
Figure 5C:
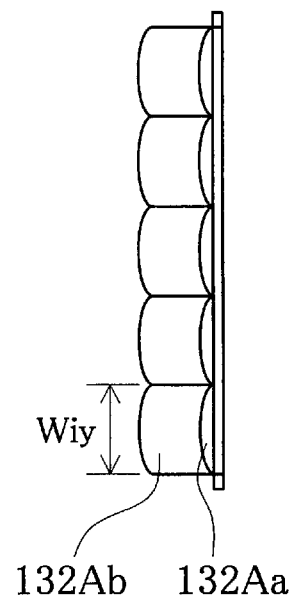

FIG. 5 shows the appearance of the second lens array 130A. FIGS. 5A, 5B, and 5C are respectively a plan view, a front view, and a side view. The second lens array 130A includes a plurality of second minute lenses 132A$a$, which respectively correspond to the plurality of sub-beams transmitted through the polarizing separation films 142, and a plurality of third minute lenses 132A$b$, which respectively correspond to the plurality of sub-beams reflected by the polarizing separation films 142 and the reflection films 144. The second minute lens 132A$a$ and the third minute lens 132A$b$ have a width in the y-axis direction that is set to be substantially equal to the width Wiy of the first minute lens 122 in the y-axis direction, and a width in the x-axis direction that is set to be substantially equal to half the width Wix of first minute lens 122 in the x-axis direction. As shown in FIG. 1, the second lens array 130A is arranged to make the curved faces of the second minute lenses 132A$a$ and the third minute lenses 132A$b$ face the polarization conversion optical system 140. The curved faces of the third minute lenses 132A$b$ are set in position to be higher than the curved faces of the second minute lenses 132A$a$ by a length Di, because of the reasons discussed later. The position of the curved faces of the third minute lenses 132A$b$ is accordingly displaced from the position of the curved faces of the second minute lenses 132A$a$ toward the polarization conversion optical system 140 by the length Di as shown in FIG. 1. The second minute lenses 132A$a$ and the third minute lenses 132A$b$ have the curved faces of an identical shape. The shape of the curved faces is determined by taking into account the refractive index and the focal distance.

The sub-beams entering the second minute lenses 132A$a$ and the third minute lenses 132A$b$ in the second lens array 130A, which correspond to images generated in the plurality of first minute lenses 122, are eventually superimposed by the superimposing lens 150 to form a resulting image on the area LA.

The plurality of sub-beams transmitted through the polarizing separation films 142 in the polarization conversion optical system 140 shown in FIG. 1 enter the superimposing lens 150 via the corresponding second minute lenses 132A$a$ of the second lens array 130A. The plurality of sub-beams reflected by the polarizing separation films 142 and the reflection films 144 enter the superimposing lens 150 via the corresponding third minute lenses 132A$b$ of the second lens array 130A. The plurality of sub-beams entering the superimposing lens 150 are substantially superimposed on the area LA. In the above manner, the illumination optical system 100A of the embodiment enables the area LA to be illuminated with substantially one fixed type of linearly polarized light beam.

The illumination optical system 100A is characterized by the second lens array 130A of FIG. 5 arranged on the outgoing side of the polarization conversion optical system 140. More specifically the illumination optical system 100A is characterized by the arrangement that the curved faces of the third minute lenses 132A$b$ are displaced in position from the curved faces of the second minute lenses 132A$a$ toward the polarization conversion optical system 140 by the length Di.

Figure 6A:
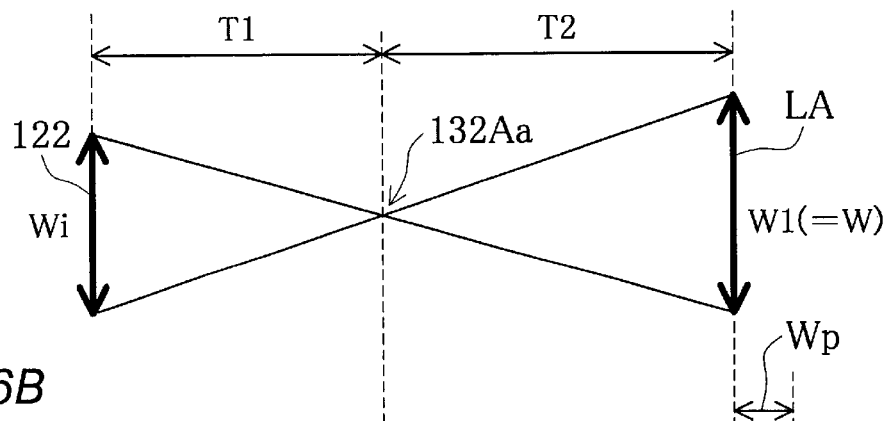
FIGS. 6A through 6C show the functions of the second lens array 130A.
Figure 6B:
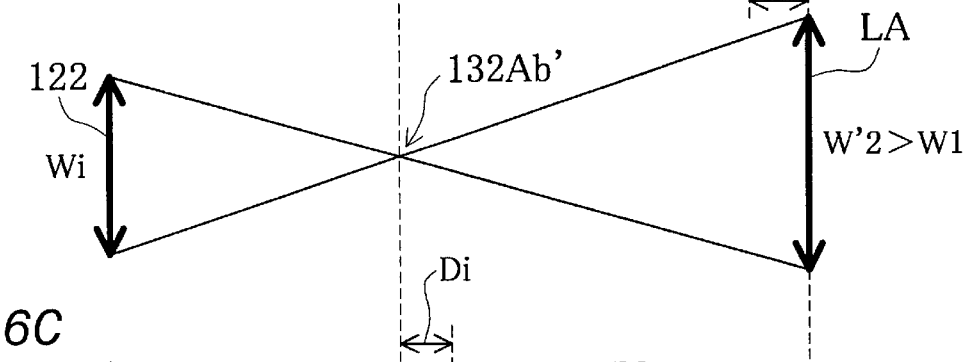
Figure 6C:
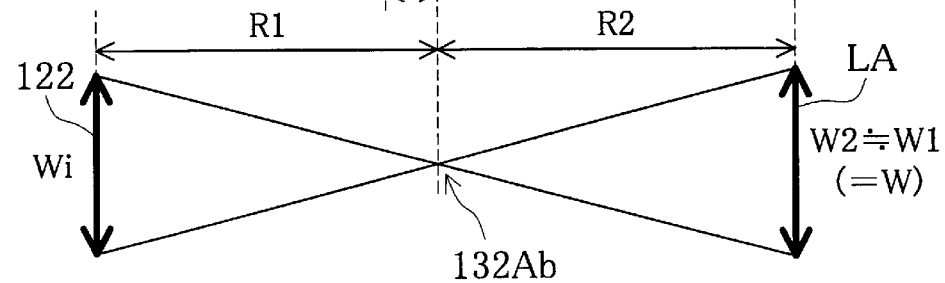

FIG. 6 shows the functions of the second lens array 130A. FIG. 6A shows the optical path of the light transmitted by the polarizing separation film 142 (hereinafter may be simply referred to as the 'transmitted light'). FIGS. 6B and 6C show, on the other hand, the optical paths of the light reflected by the polarizing separation film 142 and the reflection film 144 (hereinafter may be simply referred to as the 'reflected light'). The optical path of FIG. 6B is on the assumption that third minute lenses 132A$b$' are arranged to have their curved faces at a height identical with the curved faces of the second minute lenses 132A$a$. For the simplicity of explanation, in the illustration of FIG. 6, the optical path of the reflected light by the polarizing separation film 142 and the reflection film 144 is replaced by an equivalent linear optical path, and deflection of light by the superimposing lens 150 is neglected.

Figure 14A:
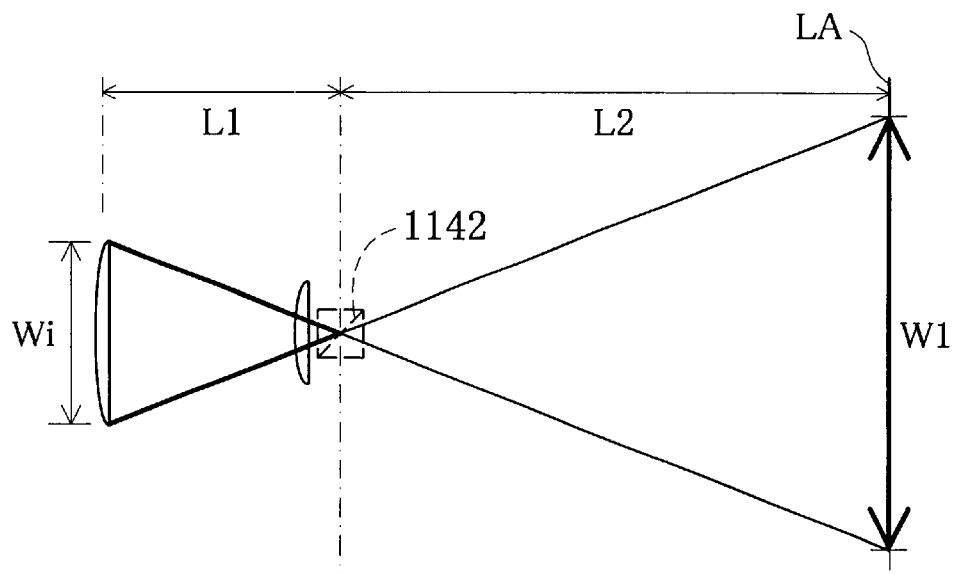
FIGS. 14A and 14B show drawbacks of the prior art illumination optical system.
Figure 14B:
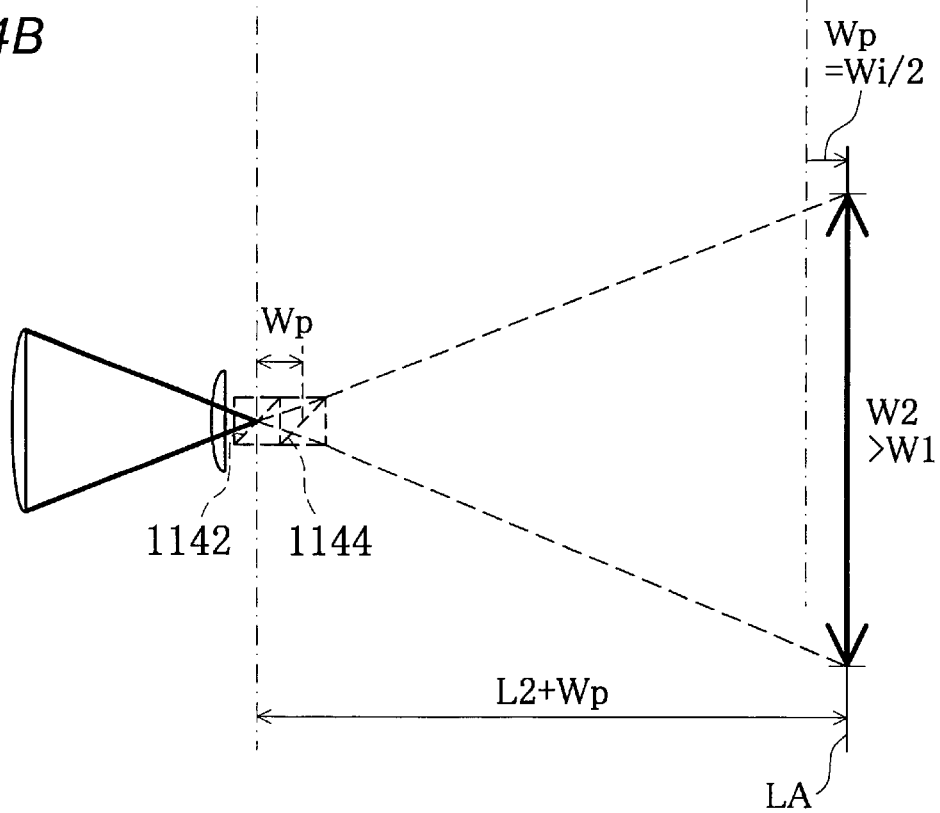

As shown in FIGS. 6A and 6B, when the curved faces of the third minute lenses 132A$b$' are positioned at the same height as that of the curved faces of the second minute lenses 132A$a$, that is, in the case of the length Di=0, like the prior art illumination optical system discussed previously with FIG. 14, the optical path length of the reflected light is greater than the optical path length of the transmitted light by a distance substantially equal to the optical path length Wp from the polarizing separation film 142 to the reflection film 144 (Wp denotes the distance between the polarizing separation film 142 and the reflection film 144). The size of a second region W2' on the area LA illuminated with the reflected light is accordingly greater than the size of a first region W1 illuminated with the transmitted light.

The width of the reflected light entering the third minute lenses 132A$b$ varies with a variation in position of the curved faces of the third minute lenses 132A*b* as shown in FIG. 6C. This results in varying the size of a second region W2 on the area LA illuminated with the reflected light. More specifically displacing the position of the curved faces of the third minute lenses 132A*b* from the position of FIG. 6B toward the polarization conversion optical system 140 reduces the size of the second region W2 on the area LA illuminated with the reflected light (see FIG. 1). This arrangement enables the adjustment to make the size of the first region Wi substantially equal to the size of the second region W2.

The length Di, that is, the amount of displacement or the difference between the position of the curved faces of the second minute lenses 132A*a* and the position of the curved faces of the third minute lenses 132A*b* is determined in the following manner.

Equations (1) through (3) given below are obtained from the geometric relations in FIGS. 6A through 6C:

$$T1/T2 = R1/R2 = Wi/W \quad (1)$$

$$T1 + T2 + Wp = R1 + R2 \quad (2)$$

$$T1 + Di = R1 \quad (3)$$

Here T1 denotes the optical path length between the first minute lenses 122 and the second minute lenses 132A*a*, and T2 denotes the optical path length between the second minute lenses 132A*a* and the area LA. R1 denotes the optical path length between the first minute lenses 122 and the third minute lenses 132A*b*, and R2 denotes the optical path length between the third minute lenses 132A*b* and the area LA. Wi denotes the size of the first minute lens 122, and W denotes the size of the first region W1 on the area LA. Wp denotes the distance between the polarizing separation film 142 and the reflection film 144 and is substantially equal to the difference in optical path length between the transmitted light and the reflected light in the polarization conversion optical system 140.

The amount of displacement Di is calculated according to Equation (4), which is obtained from Equations (1) through (3) and is defined as:

$$Di = R1 - T1 = (Wp \cdot Wi)/(Wi + W) \quad (4)$$

Equation (4) readily determines the amount of displacement Di or the difference between the position of the curved faces of the second minute lenses 132A*a* and the position of the curved faces of the third minute lenses 132A*b* in the second lens array 130A. The amount of displacement Di is generally set in the range of 0<Di<Wi, although the amount of displacement Di may be set in the range of Di>Wi.

In the arrangement of FIG. 1, the second lens array 130A is apart from the superimposing lens 150. In a modified arrangement, the second lens array 130A may be located adjacent to the superimposing lens 150 or bonded to the superimposing lens 150 with an optical adhesive. The polarization conversion optical system 140 is also apart from the second lens array 130A in the arrangement of FIG. 1. Similarly the polarization conversion optical system 140 may be located adjacent to or bonded to the second lens array 130A.

FIG. 7 is a plan view schematically illustrating the structure of an illumination optical system 100B, which is one modification of the illumination optical system 10A. In the illumination optical system 100B, a second lens array 130B replaces the second lens array 130A included in the illumination optical system 100A shown in FIG. 1. The second lens array 130B is arranged to make the curved faces of second minute lenses 132B*a* and third minute lenses 132B*b* face the superimposing lens 150. In this case, it is preferable that the position of the curved faces of the second minute lenses 132B*a* is higher than the position of the curved faces of the third minute lenses 132B*b* by a length Di. Although the polarization conversion optical system 140 is apart from the second lens array 130B in the arrangement of FIG. 7, the polarization conversion optical system 140 may be located adjacent to or bonded to the second lens array 130B.

Figure 8:
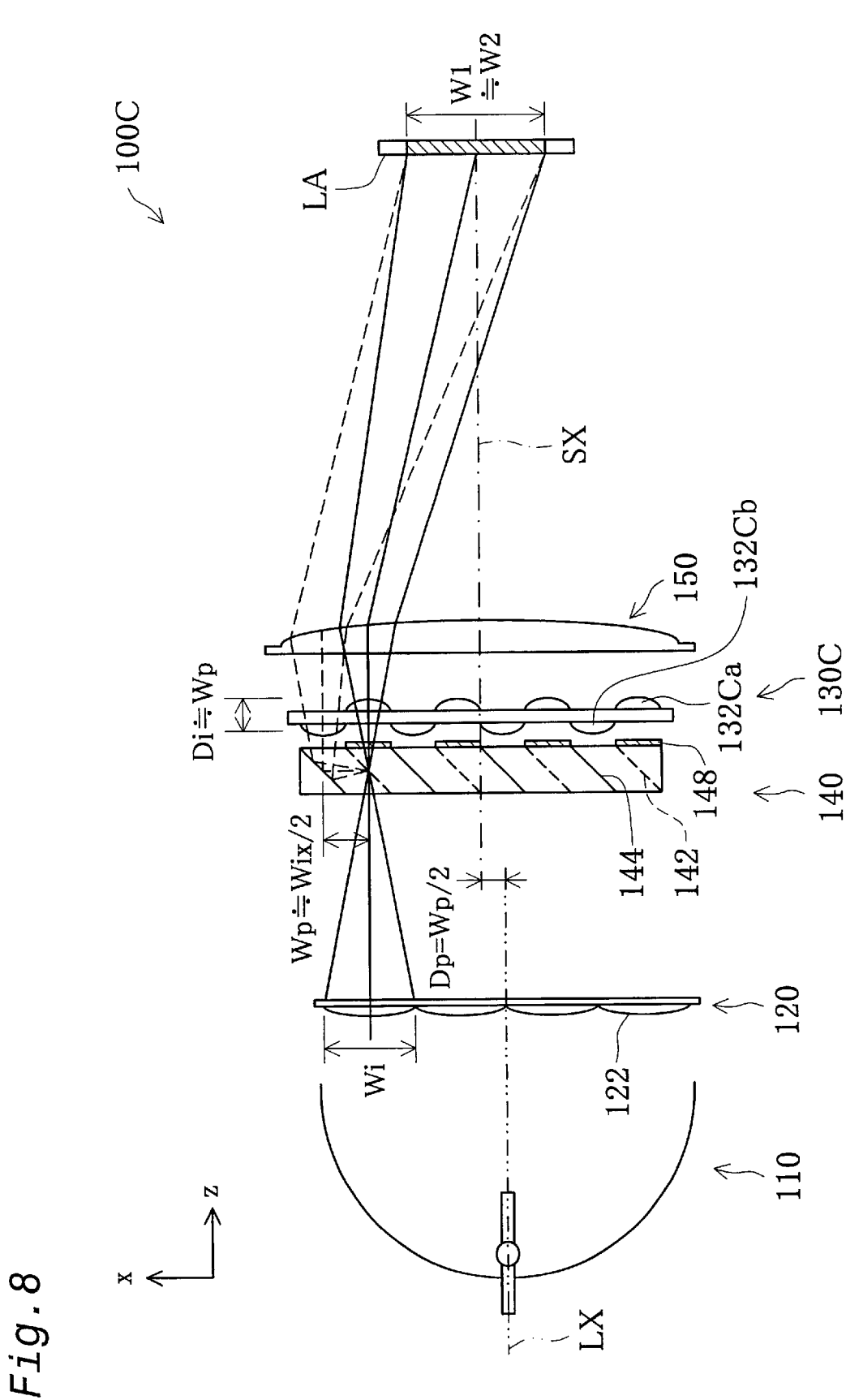
FIG. 8 is a plan view schematically illustrating the structure of still another illumination optical system 100C, which is another modification of the illumination optical system 100A of FIG. 1.

FIG. 8 is a plan view schematically illustrating the structure of an illumination optical system 100C, which is another modification of the illumination optical system 10A. In the illumination optical system 100C, a second lens array 130C replaces the second lens array 130A included in the illumination optical system 100A shown in FIG. 1. The second lens array 130C is arranged to make the curved faces of second minute lenses 132C*a* face the superimposing lens 150 while making the curved faces of third minute lenses 132C*b* face the polarization conversion optical system 140. In this case, it is preferable that there is a difference Di between the position of the curved faces of the second minute lenses 132C*a* and the position of the curved faces of the third minute lenses 132C*b*. Although the polarization conversion optical system 140 is apart from the second lens array 130C in the arrangement of FIG. 8, the polarization conversion optical system 140 may be located adjacent to or bonded to the second lens array 130C.

The above embodiment and its modified examples may further be modified or changed as discussed below.

Figure 9:
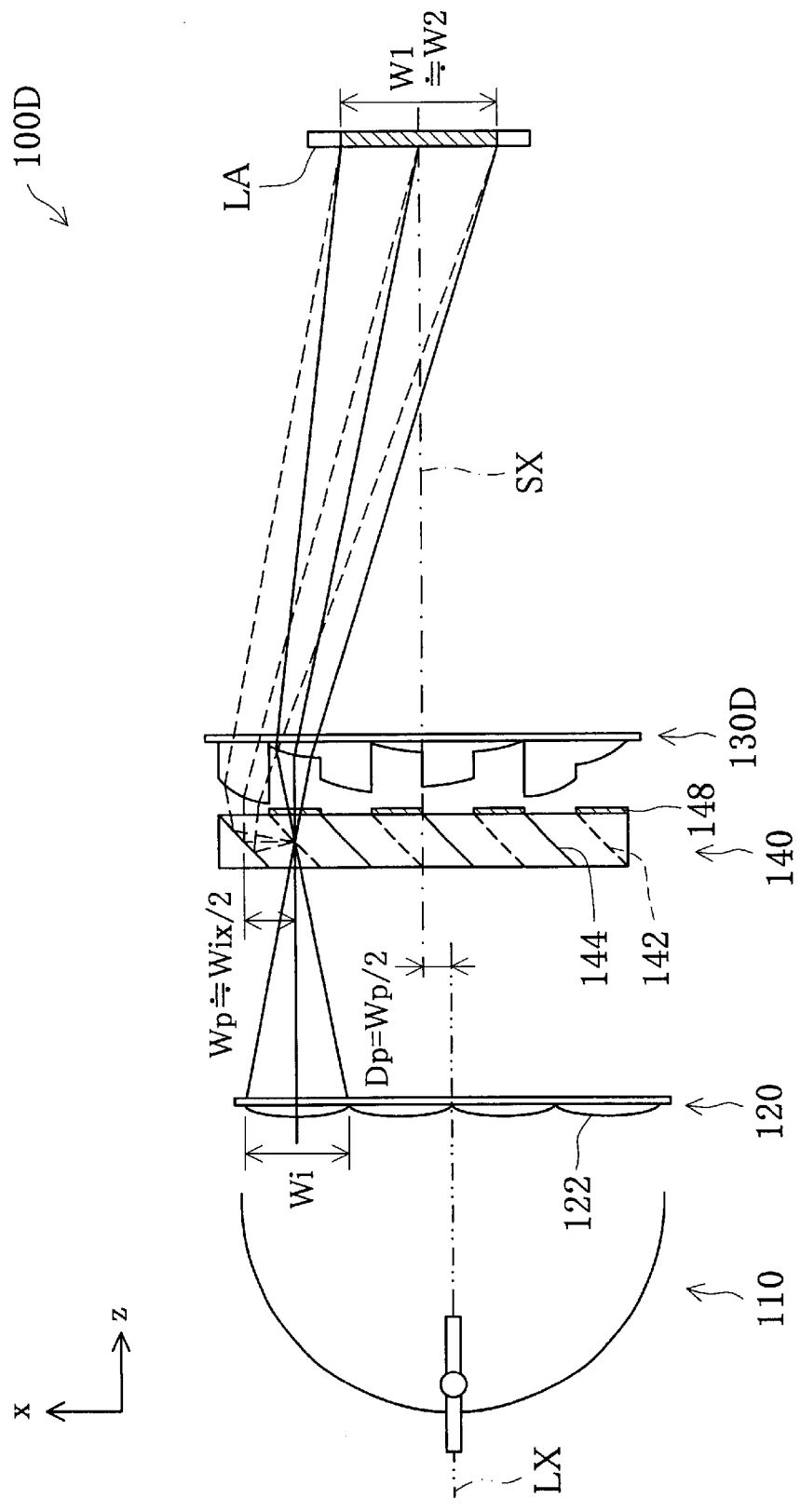
FIG. 9 is a plan view schematically illustrating the structure of another illumination optical system 100D, which is still another modification of the illumination optical system 100A of FIG. 1.

FIG. 9 is a plan view schematically illustrating the structure of an illumination optical system 100D, which is still another modification of the illumination optical system 100A. In the illumination optical system 100D, a second lens array 130D replaces the second lens array 130A and the superimposing lens 150 included in the illumination optical system 100A shown in FIG. 1. In the second lens array 130D, second minute lenses 132A*a* and third minute lenses 132A*b* are all eccentric lenses that respectively have quantities of eccentricity corresponding to their positions, so as to attain the synthesized function of the superimposing lens 150.

Figure 10:
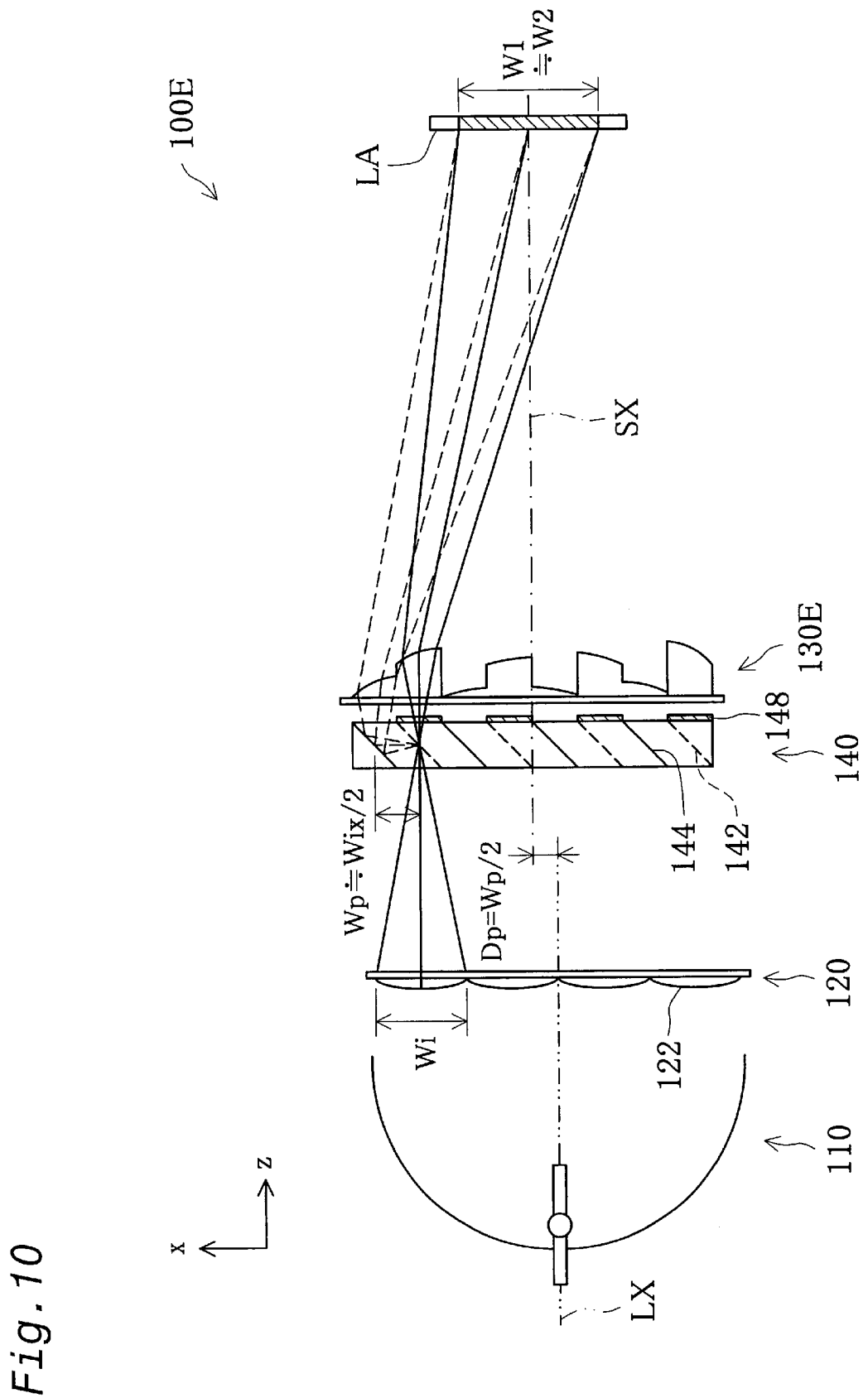
FIG. 10 is a plan view schematically illustrating the structure of another illumination optical system 100E, which is one modification of the illumination optical system 100B of FIG. 7.

FIG. 10 is a plan view schematically illustrating the structure of an illumination optical system 100E, which is one modification of the illumination optical system 100B shown in FIG. 7. In the illumination optical system 100E, a second lens array 130E replaces the second lens array 130B and the superimposing lens 150 included in the illumination optical system 100B shown in FIG. 7. In the second lens array 130E, second minute lenses 132B*a* and third minute lenses 132B*b* are all eccentric lenses that respectively have quantities of eccentricity corresponding to their positions, so as to attain the synthesized function of the superimposing lens 150.

Figure 11:
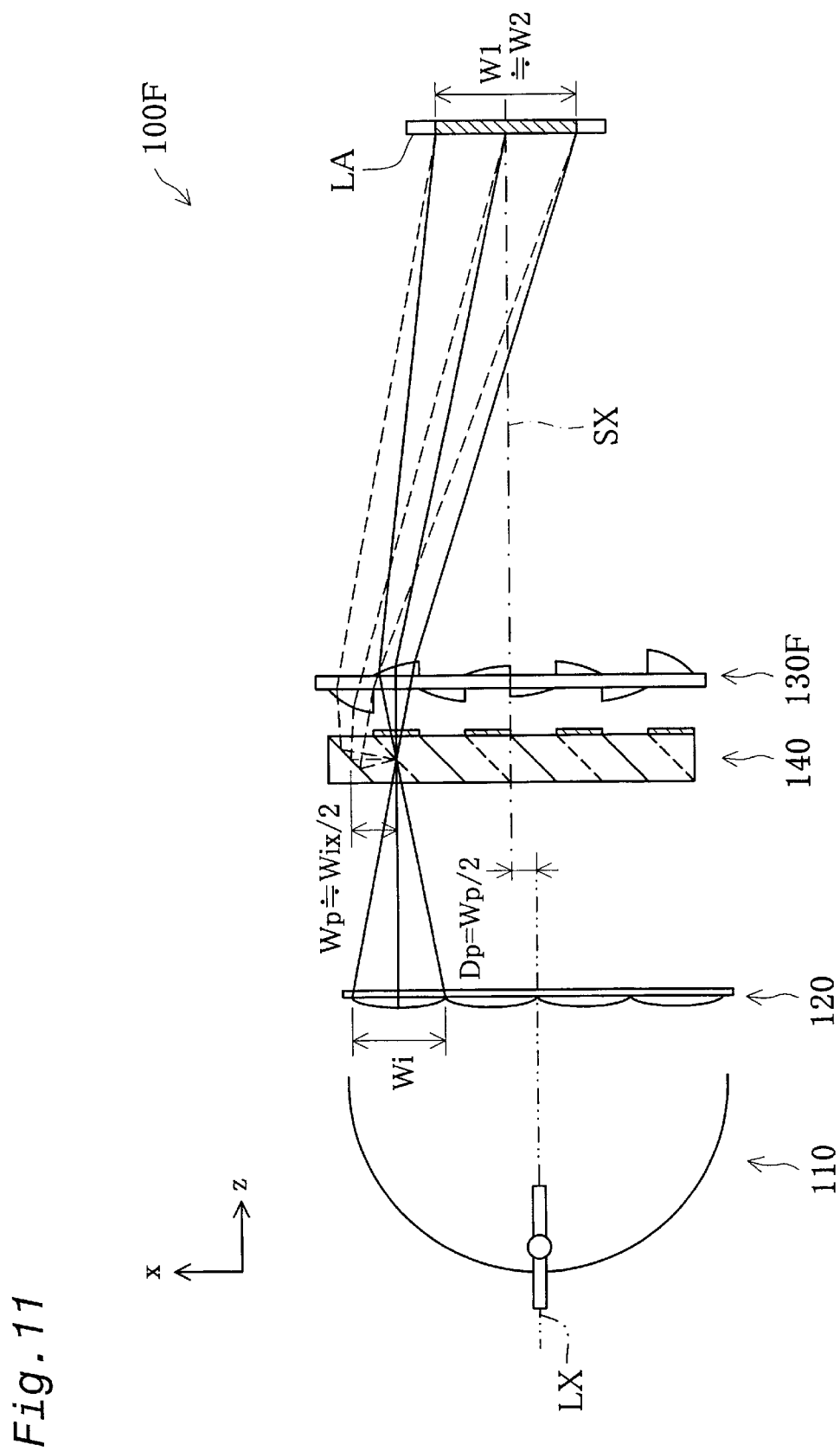
FIG. 11 is a plan view schematically illustrating the structure of still another illumination optical system 100F, which is one modification of the illumination optical system 100C of FIG. 8.

FIG. 11 is a plan view schematically illustrating the structure of an illumination optical system 100F, which is one modification of the illumination optical system 100C shown in FIG. 8. In the illumination optical system 100F, a second lens array 130F replaces the second lens array 130C and the superimposing lens 150 included in the illumination optical system 100C shown in FIG. 8. In the second lens array 130F, second minute lenses 132C*a* and third minute lenses 132C*b* are all eccentric lenses that respectively have quantities of eccentricity corresponding to their positions, so as to attain the synthesized function of the superimposing lens 150.

In any of the embodiment and its modified examples discussed above, the position of the curved faces of the third minute lenses is displaced from the position of the curved faces of the second minute lenses toward the polarization conversion optical system 140. This arrangement enables the adjustment to make the size of the area illuminated with the light transmitted by the polarizing separation films 142 substantially equal to the size of the area illuminated with the light reflected by the polarizing separation films 142 and the reflection films 144. Such adjustment advantageously prevents the significant reduction of the illuminating efficiency occurring in the prior art illumination optical system. The illumination optical systems 100D through 100F do not require the superimposing lens 150. This simplifies the structure and reduces the manufacturing cost of the illumination optical system.

In the embodiment and its modified examples discussed above, the respective optical elements are arranged along the linearly extending system optical axis SX. The present invention is, however, not restricted to such linear arrangement. In other possible applications, a reflector is located at a selected position between adjoining optical elements to deflect the optical path of light.

As clearly understood from the above explanation, the first lens array and the second lens array respectively correspond to the first optical system and the second optical system of the present invention. The first minute lenses through the third minute lenses respectively correspond to the first lenses through the third lenses of the present invention.

B. Projector

Figure 12:
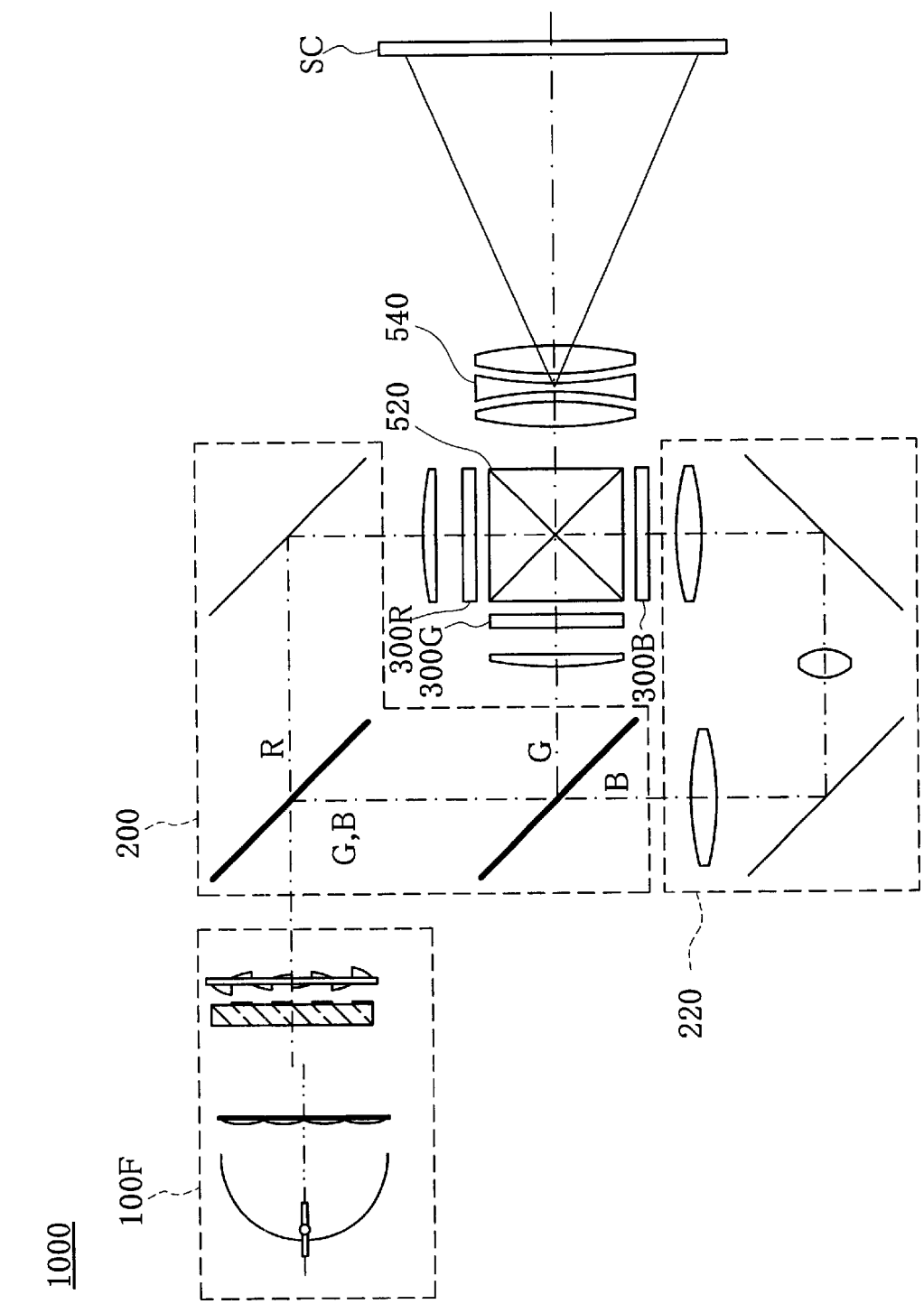
FIG. 12 shows a projector to which the illumination optical system of the present invention is applied.
Figure 13:
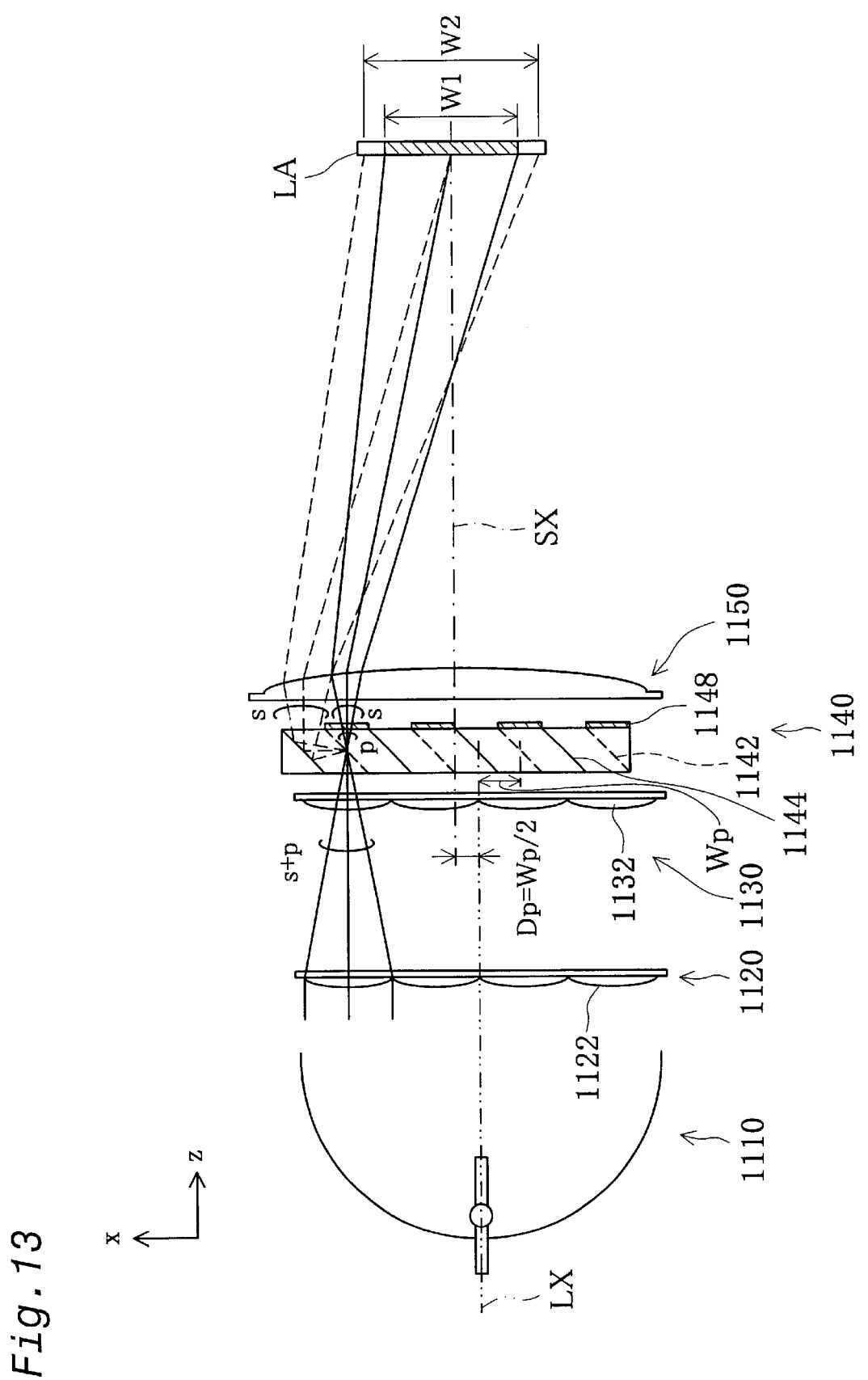
FIGS. 13 is a plan view schematically illustrating the structure of a main part of a prior art illumination optical system.

FIG. 12 schematically illustrates the structure of a projector 1000, for which the illumination optical system embodying the present invention is applied. The projector 1000 includes the illumination optical system 100F, a color light separation optical system 200, a relay optical system 220, three transmission-type liquid crystal light valves (liquid crystal panels) 300R, 300G, and 300B, a cross dichroic prism 520, and a projection optical system 540.

The illumination optical system 100F emits the linearly polarized light beams having a fixed direction of polarization (in the above discussion, the s-polarized light beams). The light emitted from the illumination optical system 100F is divided into three color light components of red (R), green (G), and blue (B) by the color light separation optical system 200. The separated color light components are respectively transmitted to the liquid crystal light valves 300R, 300G, and 300B, which correspond to the area LA, and modulated according to color signals (image information) of the respective color light components. The modulated light fluxes of three colors by the liquid crystal light valves 300R, 300G, and 300B are synthesized together by the cross dichroic prism 520 and projected on a screen 5C by the projection optical system 540. A color image is accordingly displayed on the screen SC. The structures and the functions of the respective constituents of the projector as shown in FIG. 12 are described in detail in JAPANESE PATENT LAID-OPEN GAZETTE No. 10-32594 disclosed by the applicant of the present invention. The detailed description is thus omitted from the specification herein.

The projector 1000 utilizes the illumination optical system 100F, which effectively overcomes the drawback of the prior art illumination optical system, that is, the significant reduction of the illuminating efficiency, and thus enables brighter images to be displayed.

Any of the illumination optical systems of the embodiment and its modified examples discussed above may be applied for the illumination optical system of the projector 1000 to exert the similar effects.

The liquid crystal light valves 300R, 300G, and 300B correspond to the electro-optical device of the present invention.

The above embodiment and its modifications are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein. Some examples of possible modification are given below.

(1) In the illumination optical systems discussed above, the significant reduction of the illuminating efficiency is prevented by the arrangement that the position of the curved faces of the second minute lenses is displaced from the position of the curved faces of the third minute lenses in the second lens array. The technique of the present invention is, however, not restricted to such arrangement, but the same purpose may be attained by different settings. In another application, the significant reduction of the illuminating efficiency is prevented by setting different shapes to the curved faces of the second minute lenses and the curved faces of the third minute lenses in the second lens array. Still another application varies both the shape and the position of the curved faces to prevent the significant reduction of the illuminating efficiency. The requirement is thus that the optical properties of at least one of the second minute lenses and the third minute lenses should be adjusted to make the size of the illuminating region illuminated with the light transmitted by the polarizing separation films substantially equal to the size of the illuminating region illuminated with the light reflected by the polarizing separation films and the reflection films. The optical properties specified in the present invention include not only the general optical properties like the refractive index and the shape of the curved faces but the position of the curved faces of the lenses.

(2) Each of the illumination optical systems discussed above includes the polarization conversion optical system having plural pairs of the polarizing separation film and the reflection film. The polarization conversion optical system may alternatively have only one pair of the polarizing separation film and the reflection film.

(3) The projector discussed above uses the transmission-type liquid crystal light valves as the electro-optical device. The electro-optical device is, however, not restricted to this example. The projector may alternatively use reflection-type liquid crystal light valves. In general, the projector may use any electro-optical device that utilizes specific linearly polarized light as illumination light.

(4) The above description regards the application of the illumination optical system of the present invention for the projector. The application is, however, not restricted to this example. The illumination optical system of the present invention is applicable for a diversity of systems, apparatuses, and devices.

The scope and spirit of the present invention are indicated by the appended claims, rather than by the foregoing description.

What is claimed is:

1. An illumination optical system that emits illumination light, comprising:

a light source that emits non-polarized light;

a polarization conversion optical system that comprises at least one pair of a polarizing separation film and a reflection film, which are arranged to be mutually in parallel with each other and to be inclined relative to a predetermined direction, the polarization conversion optical system converting incident non-polarized light into linearly polarized light having a predetermined direction of polarization;

a first optical system that comprises at least one first lens, which is arranged on an optical path between the light source and the polarizing separation film to emit a first light beam; and a second optical system that comprises a second lens, which receives an incident second light beam that is a component of the first light beam emitted from the first lens and is transmitted by the polarizing separation film, and a third lens, which receives an incident third light beam that is another component of the first light beam emitted from the first lens and is reflected by the polarizing separation film and the reflection film, wherein an optical property of at least one of the second lens and the third lens is adjusted to make a size of a first region on a predetermined area, which is irradiated with the second light beam, substantially equal to a size of a second region on the predetermined area, which is irradiated with the third light beam.

2. An illumination optical system in accordance with claim 1, wherein the adjustment displaces the position of a curved face of the third lens from the position of a curved face of the second lens.

3. An illumination optical system in accordance with claim 2, wherein the second lens and the third lens have curved faces of an identical shape.

4. An illumination optical system in accordance with claim 3, wherein a difference Di between the position of the curved face of the second lens and the position of the curved face of the third lens is determined by an equation given below:

$$Di=(Wp\cdot Wi)/(Wi+W)$$

where Wi denotes a size of the first lens, W denotes the size of the first area, and Wp denotes a distance between the polarizing separation film and the reflection film.

5. An illumination optical system in accordance with claim 2, wherein a difference Di between the position of the curved face of the second lens and the position of the curved face of the third lens is determined by an equation given below:

$$Di=(Wp\cdot Wi)/(Wi+W)$$

where Wi denotes a size of the first lens, W denotes the size of the first area, and Wp denotes a distance between the polarizing separation film and the reflection film.

6. A projector that projects an image, comprising:

an illumination optical system that emits illumination light;

an electro-optical device that modulates the light emitted from the illumination optical system according to image information; and a projection optical system that projects the modulated light by the electro-optical device, the illumination optical system comprising:
  a light source that emits non-polarized light;
  a polarization conversion optical system that comprises at least one pair of a polarizing separation film and a reflection film, which are arranged to be mutually in parallel with each other and to be inclined relative to a predetermined direction, the polarization conversion optical system converting incident non-polarized light into linearly polarized light having a predetermined direction of polarization;
  a first optical system that comprises at least one first lens, which is arranged on an optical path between the light source and the polarizing separation film to emit a first light beam; and
  a second optical system that comprises a second lens, which receives an incident second light beam that is a component of the first light beam emitted from the first lens and is transmitted by the polarizing separation film, and a third lens, which receives an incident third light beam that is another component of the first light beam emitted from the first lens and is reflected by the polarizing separation film and the reflection film,
  wherein an optical property of at least one of the second lens and the third lens is adjusted to make a size of a first region on the electro-optical device, which is irradiated with the second light beam, substantially equal to a size of a second region on the electro-optical device, which is irradiated with the third light beam.

7. A projector in accordance with claim 6, wherein the adjustment displaces the position of a curved face of the third lens from the position of a curved face of the second lens.

8. A projector in accordance with claim 7, wherein the second lens and the third lens have curved faces of an identical shape.

9. A projector in accordance with claim 8, wherein a difference Di between the position of the curved face of the second lens and the position of the curved face of the third lens is determined by an equation given below:

$$Di=(Wp\cdot Wi)/(Wi+W)$$

where Wi denotes a size of the first lens, W denotes the size of the first area, and Wp denotes a distance between the polarizing separation film and the reflection film.

10. A projector in accordance with claim 7, wherein a difference Di between the position of the curved face of the second lens and the position of the curved face of the third lens is determined by an equation given below:

$$Di=(Wp\cdot Wi)/(Wi+W)$$

where Wi denotes a size of the first lens, W denotes the size of the first area, and Wp denotes a distance between the polarizing separation film and the reflection film.

* * * * *